UNITED STATES PATENT OFFICE.

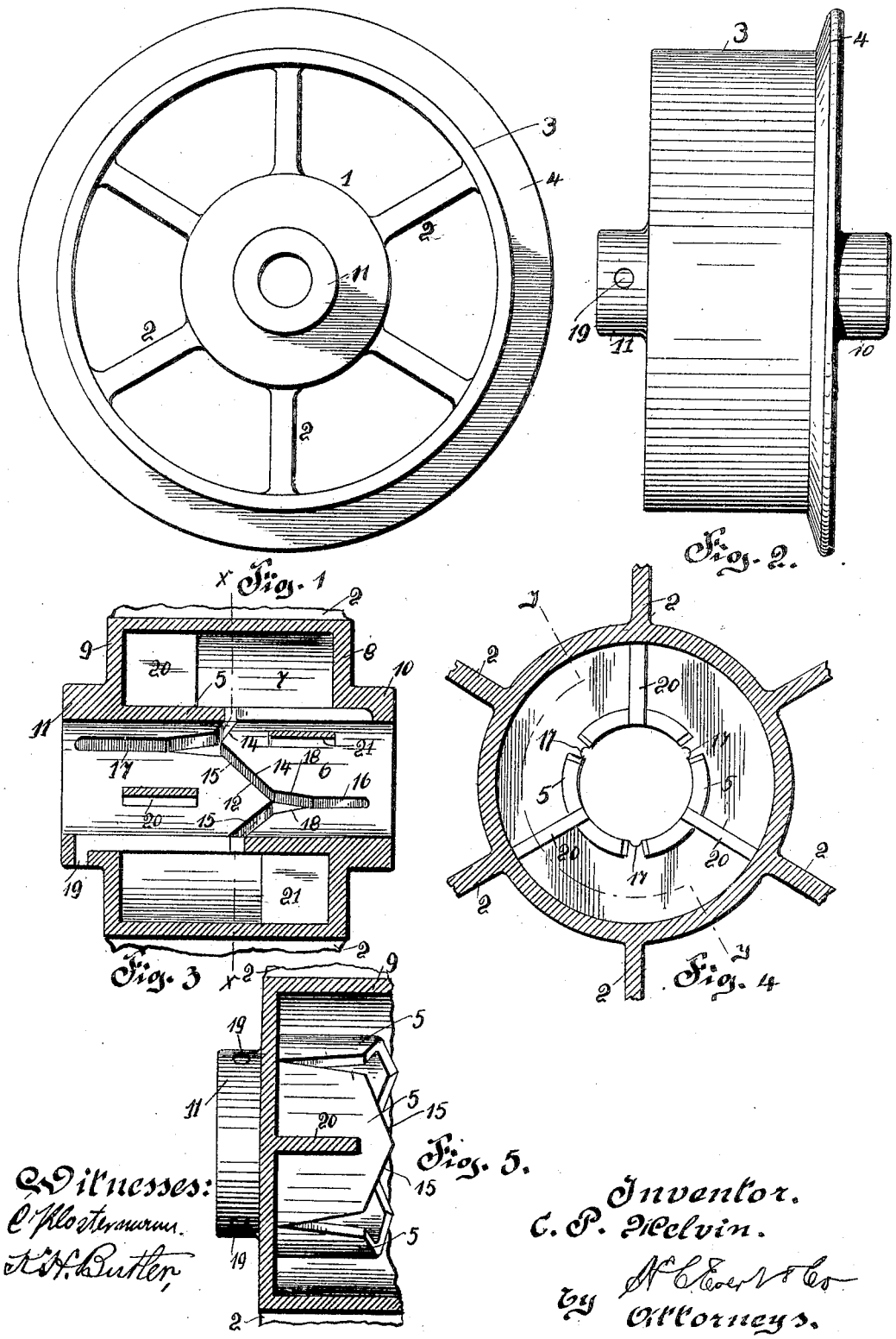

CHARLES P. MELVIN, OF MONONGAHELA, PENNSYLVANIA.

WHEEL.

No. 813,225.  Specification of Letters Patent.  Patented Feb. 20, 1906.

Application filed May 13, 1905. Serial No. 260,234.

*To all whom it may concern:*

Be it known that I, CHARLES P. MELVIN, a citizen of the United States of America, residing at Monongahela, in the county of Washington and State of Pennsylvania, have invented certain new and useful Improvements in Wheels, of which the following is a specification, reference being had therein to the accompanying drawings.

This invention relates to certain new and useful improvements in wheels, and more particularly to car-wheels adapted to be used in connection with mining-cars, pit-cars, and the like vehicles.

The primary object of the invention is to provide a wheel having a novel form of hub adapted to contain a suitable lubricant for lubricating all parts of an axle or spindle upon which the wheel is journaled.

My invention aims to provide a novel form of hub for wheels, pulleys, gears, and the like revoluble members in which a suitable lubricant can be easily and quickly placed and carried, whereby it will be automatically fed to surfaces of the axle or shaft upon which the wheel is journaled to assure an easy, perfect, and non-frictional rotation of the wheel or pulley upon a shaft or axle. To this end I have devised a novel form of receptacle or lubricant-compartment for retaining a suitable lubricant in close proximity to a member or element to be lubricated. The lubricant receptacle or compartment is constructed whereby it will retain a large quantity of lubricant, consequently dispensing with the frequent and necessary refilling of similar receptacles or compartments.

My improved hub is adapted to thoroughly lubricate the bearing-surfaces existing between the hub of a wheel and the axle or shaft, and the simplicity of construction employed in connection with my improved wheel reduces the cost of manufacture to a minimum, at the same time maintaining a strong and durable construction necessary in connection with wheels of this type.

The invention finally consists in the novel construction, combination, and arrangement of parts which will be hereinafter more fully described and then specifically pointed out in the claims, and, referring to the drawings accompanying this application, like numerals of reference designate corresponding parts throughout the several views, in which—

Figure 1 is a side elevation of my improved wheel. Fig. 2 is an edge view of the same. Fig. 3 is a vertical transverse sectional view of the hub portion of said wheel. Fig. 4 is a vertical longitudinal sectional view taken on the line $x\ x$ of Fig. 3; and Fig. 5 is a fragmentary transverse sectional view taken on the line $y\ y$ of Fig. 4, illustrating the peculiar construction of the hub portion of my improved wheel.

To put my invention into practice, I construct my improved wheels of a casting wherein a hub portion 1, spokes 2, a rim or tread 3, and a peripheral flange 4 are embodied to provide a wheel particularly adapted for mining-cars. My invention resides in the novel construction of the hub portion 1, and this construction can best be seen in Fig. 3 of the drawings. By referring to said figure it will be observed that the hub portion is provided with inwardly-extending shells 5 and 6, forming a bearing for an axle and also forming an annular lubricant receptacle or compartment 7. In the formation of my improved wheel I provide the sides 8 and 9 of the hub portion with bosses or peripheral flanges 10 and 11, which are adapted to encircle or embrace the axle and steady the movement of the car-wheel upon said axle.

The inwardly-extending annular or cylindrical shells 5 and 6 have their confronting edges formed to provide a sinuous and irregular slot or passage between said shells. The slot or passage-way 12 is preferably constructed centrally of the hub, and its sinuous or irregular formation is preferably formed of the angularly-disposed confronting edges 14 14 of the shell 6 and 15 15 of the shell 5. I also provide the shells 5 and 6, forming the bearing-surfaces of the hub, with a plurality of longitudinally-disposed slots 16 and 17, the slots 16 and 17 being formed in the shells 5 and 6, respectively. The inner ends of these slots are enlarged or provided with outwardly-tapering sides 18 18. These ends of the slots are adapted to terminate at the vertex of the angularly-disposed confronting edges 14 and 15 of the shells 5 and 6. The opposite ends of the slots 16 and 17 terminate in the bosses or peripheral flanges 10 and 11 of the hub, and in the boss 11 I provide a plurality of apertures or openings 19, which communicate with the slots 17 of the shell 5 and permit of access being had to the interior of the hub or the lubricant receptacle or compartment 7.

In order to strengthen the hub portion of a wheel constructed in accordance with my invention and to provide means for elevating and properly distributing or baffling the lubricant contained within the compartment 7, I provide a plurality of radially-disposed ribs or partitions 20 and 21, the ribs 20 being constructed in the compartment 7 and in connection with the shell 5, while the ribs or partitions 21 are constructed in connection with the shell 6. The peculiar staggered arrangement of the ribs or partitions 20 and 21 provides a staggered yet circuitous path for the lubricant contained within the compartment 7, and when a wheel constructed in accordance with my invention revolves these ribs or partitions are adapted to thoroughly distribute and elevate the lubricant contained within the compartment.

In operation a lubricant contained within the compartment 7 is distributed to the surfaces of an axle by the slots 16 and passageway 12, and the peculiar formation or widening of the inner ends of the slots 16 permits of the lubricant being spread and distributed toward the center of the axle. The staggered passage-way 12 enables the lubricant to effectually reach the bearing-surface existing between the hub portion of my improved wheel and an axle, and the slots 16 and 17 will distribute the lubricant longitudinally of the axle and permit of the entire surface of the bore being thoroughly lubricated.

In practice I have found that it is only necessary to partially fill the compartment or receptacle 7—that is, that portion of the compartment or receptacle lying below the axle upon which the wheel is journaled, and by the rotation of said wheel the lubricant contained therein will be elevated and discharged or ejected upon the axle through the medium of the slots 16 and 17 and passageway 12. In employing the ribs or partitions 20 and 21 I have also devised means for continuously agitating and circulating the lubricant contained within the compartment 7 when my improved wheel is in operation, thus preventing the lubricant from freezing or coagulating.

While I have herein described the preferred manner of constructing my improved hub, it is obvious that I do not care to confine myself to the particular arrangement of the slots or passage-ways nor to the disposition or number of ribs or partitions used in connection with the lubricant receptacle or compartment, as the number of partitions and the construction of the shells depends upon the size and proportions of a wheel relative to the axle upon which it is journaled.

It will be also noted that my improved lubricating-hub may be readily embodied in all types of wheels or pulleys adapted to revolve upon another body, such as an axle or shaft, and various other slight changes and modifications in the details of construction may be made without departing from the general spirit and scope of the invention.

What I claim, and desire to secure by Letters Patent, is—

1. A wheel of the type described consisting of a flanged rim, spokes and hub, said hub having inwardly-extending annular shells, there being an annular compartment formed by said shells, the confronting edges of said shells providing a sinuous passage, said shells having slots formed therein intercepting said passage, there being a plurality of radially-disposed ribs staggeredly arranged within said compartment, said hub having openings formed therein communicating with said slots, substantially as described.

2. In a wheel of the type described, the combination with a flanged rim and spokes, of a hub supported by said spokes, said hub having an annular compartment formed therein, said compartment having a plurality of radially-disposed ribs staggeredly arranged therein, said hub having openings formed therein communicating with said compartment, said hub having a sinuous passage-way formed therein, substantially as described.

3. The combination with an axle, of a wheel having a hub, said hub having a central bore formed therein, said hub having a compartment formed therein surrounding said bore, said compartment having a plurality of radially-disposed ribs formed therein extending each part way of the length of the compartment and alternately from opposite ends thereof, means to convey the contents of said compartment to said bore, and means whereby access may be had to said compartment, substantially as described.

4. In a wheel of the character described, the combination with a hub having a central bore, of a compartment surrounding said bore, the inner wall of said compartment providing inwardly-extending shells, the confronting edges of said shell providing a sinuous passage-way, said shells having slots formed therein communicating with said passage, substantially as described.

5. In a wheel, the combination with a hub having a central bore formed therein, of a compartment surrounding said bore, the inner wall of said compartment providing confronting shells having slots formed therein affording communication between said compartment and the said bore, means whereby access may be had to said compartment, substantially as described.

6. In a wheel, the combination with a hub, of confronting shells carried by said hub, and forming a central bore, and a compartment surrounding the bore, said shells having a plurality of slots formed therein communicating with one another and extending through the shells, means whereby access may be had to said compartment.

7. In a wheel, the combination with a hub, of confronting shells carried by said hub, said shells having a plurality of slots formed therein communicating with one another, said hub having an annular compartment formed therein adapted to contain a lubricant and communicating with the bore of the hub through said slots, and means to elevate said lubricant within said compartment.

8. In a wheel, the combination with a hub having a central bore, of an annular compartment surrounding said bore, the sides of said bore having a sinuous slot formed therein communicating with said compartment, means to agitate the contents of said compartment.

9. In a wheel, the combination of a hub, said hub being formed of confronting shells providing a circuitous sinuous passage-way, the wall of said bore having slots formed therein communicating with said passage-way, a compartment communicating with said slots and said passage-way, means whereby access may be had to said compartment from the exterior of said hub, substantially as described.

10. In a wheel, the combination of a hub having a central bore, there being a lubricant-compartment surrounding said bore, the walls of said bore having a circuitous passage-way formed therein, adapted to convey the contents of said compartment to said bore, substantially as described.

In testimony whereof I affix my signature in the presence of two witnesses.

CHARLES P. MELVIN.

Witnesses:
 FRANK S. SHANER,
 GEO. T. LINN.